US010963553B2

(12) United States Patent
Bykampadi et al.

(10) Patent No.: US 10,963,553 B2
(45) Date of Patent: Mar. 30, 2021

(54) SECURITY MANAGEMENT FOR SERVICE AUTHORIZATION IN COMMUNICATION SYSTEMS WITH SERVICE-BASED ARCHITECTURE

(71) Applicant: Nokia Technologies Oy, Espoo (FI)

(72) Inventors: Nagendra S. Bykampadi, Bangalore (IN); Suresh P. Nair, Whippany, NJ (US)

(73) Assignee: Nokia Technologies Oy, Espoo (FI)

( * ) Notice: Subject to any disclaimer, the term of this patent is extended or adjusted under 35 U.S.C. 154(b) by 243 days.

(21) Appl. No.: 16/014,418

(22) Filed: Jun. 21, 2018

(65) Prior Publication Data
US 2019/0251241 A1   Aug. 15, 2019

(30) Foreign Application Priority Data
Feb. 15, 2018   (IN) .............................. 201841005883

(51) Int. Cl.
*G06F 21/33* (2013.01)
*H04L 29/06* (2006.01)
(Continued)

(52) U.S. Cl.
CPC .......... *G06F 21/335* (2013.01); *H04L 9/0825* (2013.01); *H04L 9/3242* (2013.01);
(Continued)

(58) Field of Classification Search
CPC ... G06F 21/335; H04L 9/0825; H04L 9/3242; H04L 63/0807; H04L 63/0823;
(Continued)

(56) References Cited

U.S. PATENT DOCUMENTS

2011/0314145 A1* 12/2011 Raleigh ................. H04L 47/19
709/224
2015/0295905 A1   10/2015 Leicher et al.
(Continued)

FOREIGN PATENT DOCUMENTS

| WO | 2017004373 | 1/2017 |
| WO | 2018013925 | 1/2018 |
| WO | PCT/FI2019/050107 | 2/2019 |

OTHER PUBLICATIONS

3GPP, "3rd Generation Partnership Project; Technical Specification Group Services and System Aspects; System Architecture for the 5G System; Stage 2 (Release 15)," 3GPP TS 23.501, V15.0.0, Dec. 2017, 181 pages.

(Continued)

*Primary Examiner* — Ali S Abyaneh
*Assistant Examiner* — Zoha Piyadehghibi Tafaghodi
(74) *Attorney, Agent, or Firm* — Ryan, Mason & Lewis, LLP

(57) ABSTRACT

Security management techniques for service authorization for communication systems are provided. In one or more methods, a first element or function in a home network of a communication system registers a second element or function in the home network as a service consumer of one or more services provided by at least a third element or function in the home network, receives a request from the second element or function, and provides an access token to the second element or function responsive to authenticating the second element or function, the access token being used by the second element or function to access the one or more services provided by the third element or function.

17 Claims, 8 Drawing Sheets

(51) Int. Cl.
- *H04L 9/32* (2006.01)
- *H04W 12/04* (2009.01)
- *H04W 12/08* (2009.01)
- *H04W 12/06* (2009.01)
- *H04L 9/08* (2006.01)

(52) U.S. Cl.
CPC ...... *H04L 63/0807* (2013.01); *H04L 63/0823* (2013.01); *H04L 63/0884* (2013.01); *H04W 12/04* (2013.01); *H04W 12/06* (2013.01); *H04W 12/08* (2013.01)

(58) Field of Classification Search
CPC .......... H04L 4163/0884; H04W 12/04; H04W 12/06; H04W 12/08
See application file for complete search history.

(56) References Cited

U.S. PATENT DOCUMENTS

| | | | | |
|---|---|---|---|---|
| 2016/0127894 | A1* | 5/2016 | Kahn | H04L 69/16 380/270 |
| 2017/0099148 | A1 | 4/2017 | Ochmanski et al. | |
| 2017/0142108 | A1 | 5/2017 | Zhang et al. | |
| 2018/0007557 | A1* | 1/2018 | Lee | H04W 12/04 |
| 2018/0183802 | A1* | 6/2018 | Choyi | H04L 63/102 |
| 2019/0021064 | A1* | 1/2019 | Ryu | H04W 76/27 |

OTHER PUBLICATIONS

3GPP, "3rd Generation Partnership Project; Technical Specification Group Services and System Aspects; Security Architecture and Procedures for 5G System (Release 15)," 3GPP TS 33.501, V0.7.0, Jan. 2018, 109 pages.

D. Hardt, Ed., "The OAuth 2.0 Authorization Framework," Internet Engineering Task Force (IETF) Request for Comments: 6749, https://tools.ietf.org/html/rfc6749, Oct. 2012, 77 pages.

M. Jones et al., "JSON Web Token (JWT)," Internet Engineering Task Force (IETF) Request for Comments: 7519, https://tools.ietf.org/html/rfc7519, May 2015, 31 pages.

M. Jones et al., "JSON Web Signature (JWS)," Internet Engineering Task Force (IETF) Request for Comments: 7515, https://tools.ietf.org/html/rfc7515, May 2015, 60 pages.

M. Jones et al., "JSON Web Encryption (JWE)," Internet Engineering Task Force (IETF) Request for Comments: 7516, https://tools.ietf.org/html/rfc7516, May 2015, 52 pages.

M. Jones et al., "The OAuth 2.0 Authorization Framework: Bearer Token Usage," Internet Engineering Task Force (IETF) Request for Comments: 6750, https://tools.ietf.org/html/rfc6750, Oct. 2012, 19 pages.

Nokia, "OAuth Based Service Authorization Framework for SBA," 3rd Generation Partnership Project (3GFP) TSG SA WG3 (Security), Meeting #89, Reno, Nov. 27,-Dec. 1, 2017, 7 pages.

Salman, Ola et al., "Multi-Level Security for the 5G/IoT Ubiquitous Network," 2017 Second International Conference on Fog and Mobile Edge Computing (FMEC), Department of Electrical and Computer Engineering American University of Beirut, Beirut, Lebanon, 2017, pp. 188-193.

* cited by examiner

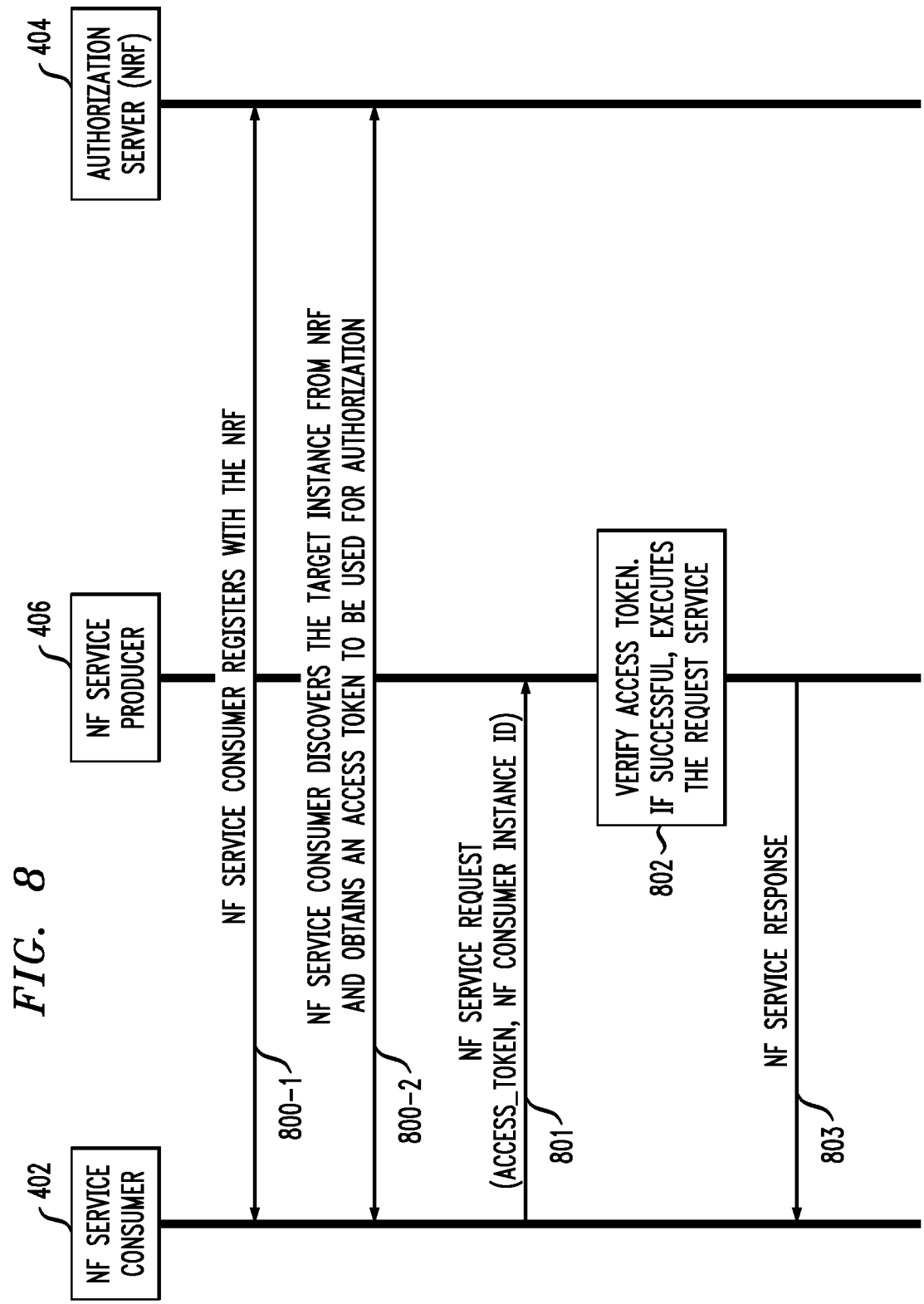

SECURITY MANAGEMENT FOR SERVICE AUTHORIZATION IN COMMUNICATION SYSTEMS WITH SERVICE-BASED ARCHITECTURE

FIELD

The field relates generally to communication systems, and more particularly, but not exclusively, to security management within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.0.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V0.7.0, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues can present a significant challenge.

SUMMARY

Illustrative embodiments provide improved techniques for security management in communication systems.

For example, in one illustrative embodiment, a method comprises a first element or function in a home network of a communication system registering a second element or function in the home network as a service consumer of one or more services provided by at least a third element or function in the home network, receiving a request from the second element or function, and providing an access token to the second element or function responsive to authenticating the second element or function, the access token being used by the second element or function to access the one or more services provided by the third element or function.

In another illustrative embodiment, a method comprises the second element or function registering with the first element or function as a service consumer of one or more services provided by the third element or function, providing a request to the first element or function, receiving an access token, providing the access token to the third element or function to request access to the one or more services provided by the third element or function, and receiving access to the requested one or more services responsive to the third element or function successfully verifying the access token.

In another illustrative embodiment, a method comprises the third element or function receiving from the first element or function a public key of the first element or function, receiving a request comprising an access token for one or more services provided by the third element or function from the second element or function, and executing the requested one or more services for the second element or function responsive to a successful verification of the access token using the public key of the first element or function.

In one or more illustrative embodiments, methods provide security management for service authorization for communication systems.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 8 illustrates a message flow for a procedure for a network function service consumer to request service access from a network function service provider using an access token, according to an illustrative embodiment.

DETAILED DESCRIPTION

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501. Other 3GPP TS/TR documents may provide other conventional details that one of ordinary skill in the art will realize. However, while well-suited for 5G-related 3GPP standards, embodiments are not necessarily intended to be limited to any particular standards.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

Figure 1:
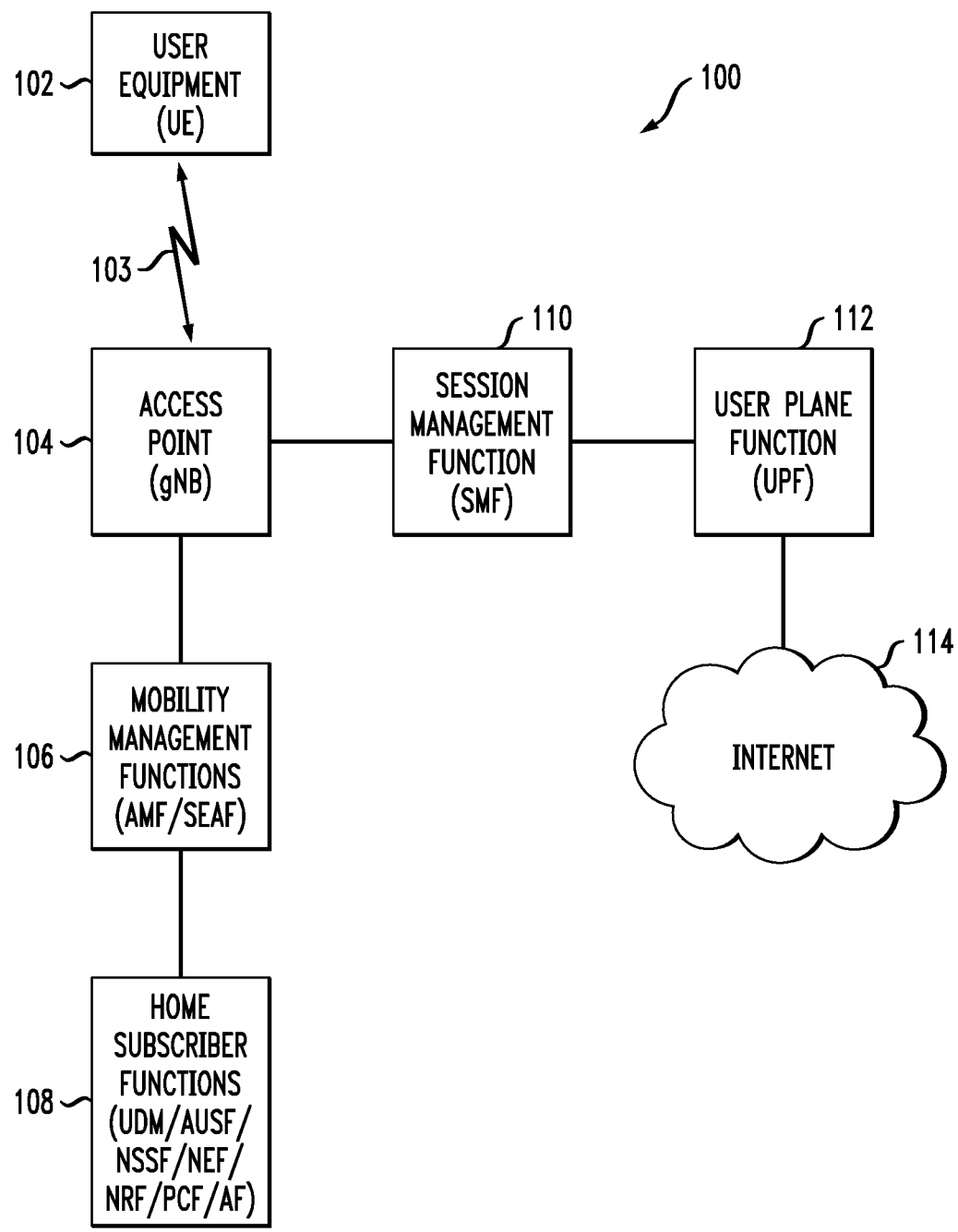
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity. In addition, home subscriber functions may include, but are not limited to, Network Slice Selection Function (NSSF), Network Exposure Function (NEF), Network Repository Function (NRF), Policy Control Function (PCF), and Application Function (AF).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation.

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
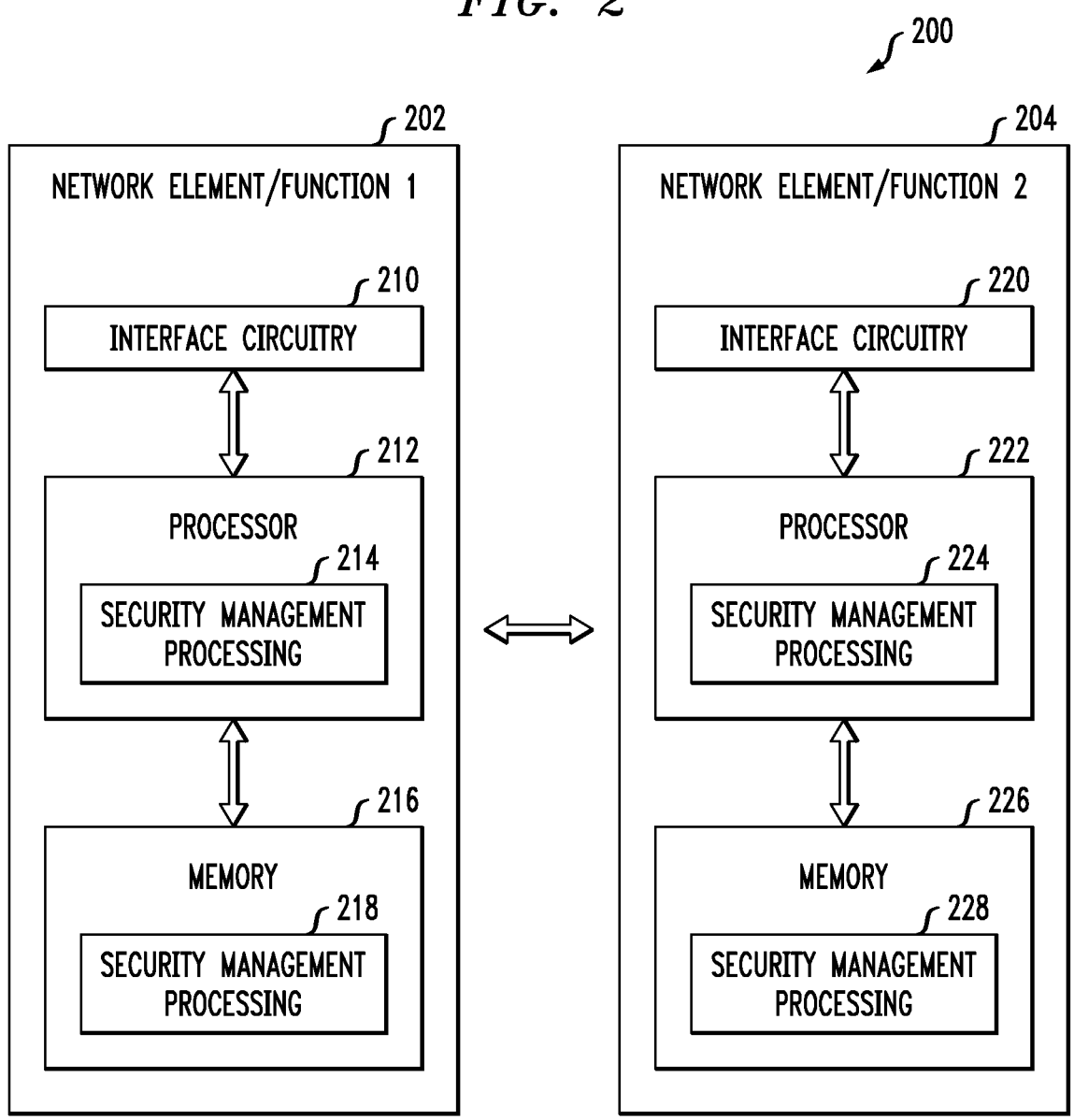
FIG. 2 illustrates network elements/functions for providing security management with which one or more illustrative embodiments may be implemented.

FIG. 2 is a block diagram of network elements/functions for providing security management in an illustrative embodiment. System 200 is shown comprising a first network element/function 202 and a second network element/function 204. It is to be appreciated that the network elements/functions 202 and 204 represent any network elements/functions that are configured to provide security management and other techniques described herein, for example, but not limited to, AMF, SEAF, UDM, AUSF, NSSF, NEF, NRF, PCF and AF. For example, the network elements/functions 202 and 204 may represent NF Service Consumers, NF Service Producers, Authorization Servers (e.g., NRFs), etc. which interact for service authorization as described in further detail herein.

The network element/function 202 comprises a processor 212 coupled to a memory 216 and interface circuitry 210. The processor 212 of the network element/function 202 includes a security management processing module 214 that may be implemented at least in part in the form of software executed by the processor. The processing module 214 performs security management, such as in service authorization, described in conjunction with subsequent figures and otherwise herein. The memory 216 of the network element/function 202 includes a security management storage module 218 that stores data generated or otherwise used during security management operations.

The network element/function 204 comprises a processor 222 coupled to a memory 226 and interface circuitry 220. The processor 222 of the network element/function 204 includes a security management processing module 224 that may be implemented at least in part in the form of software executed by the processor 222. The processing module 224 performs security management, such as in service authorization, described in conjunction with subsequent figures and otherwise herein. The memory 226 of the network element/function 204 includes a security management storage module 228 that stores data generated or otherwise used during security management operations.

The processors 212 and 222 of the respective network elements/functions 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network elements/functions 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/ function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between the network elements/functions 202 and 204. The term "data" as used herein is intended to be construed broadly, so as to encompass any type of information that may be sent between network elements/functions (as well as between user equipment and a core network) including, but not limited to, identifiers, keys, indicators, user data, control data, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

Given the general concepts described above, illustrative embodiments that address certain security management issues will now be described. More particularly, illustrative embodiments provide security management techniques for 5G systems. The architecture for 5G systems is currently being standardized in 3GPP. As mentioned above, the 3GPP TS 23.501 defines the 5G system architecture as service-based, e.g., Service-Based Architecture (SBA). The 3GPP TS 23.502 defines procedures for the SBA.

Figure 3:
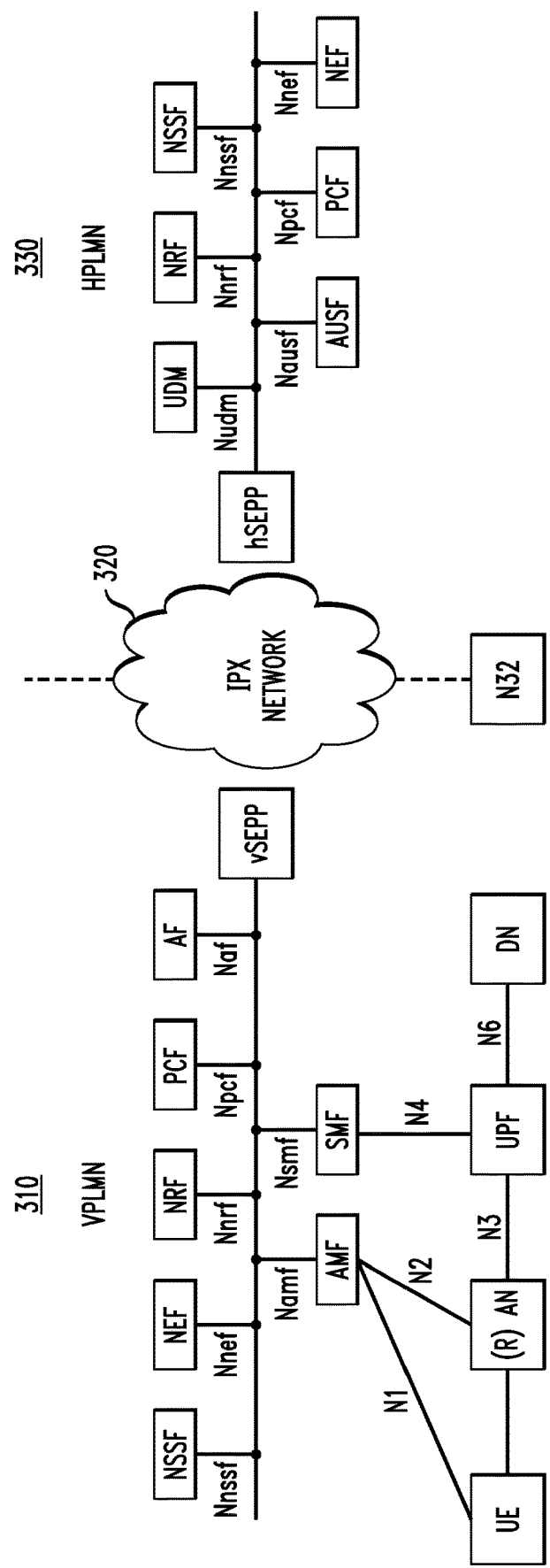
FIG. 3 illustrates a communication system architecture illustrating a service-based representation with which one or more illustrative embodiments may be implemented.

FIG. 3 depicts a 5G architecture in a configuration comprising a visiting public land mobile network (VPLMN) 310 operatively coupled via an intermediate Internetwork Packet Exchange (IPX) network 320 to a home public land mobile network (HPLMN) 330. More particularly, FIG. 3 illustrates the presence of a Security Edge Protection Proxy (SEPP) at the edge of each PLM network (e.g., vSEPP in VPLMN 310 and hSEPP in HPLMN 330). It is to be appreciated that the various network functions shown in the VPLMN 310 and the HPLMN 330 are known and described in detail in various 5G specifications such as, but not limited to, the above-referenced TS 23.501 and TS 33.501.

In the 5G SBA, services of a particular Network Function (NF) are provided only to authorized NF Service Consumers (e.g., other network functions) upon request. Therefore, service authorization procedures are required to check whether a NF Service Consumer is permitted to access a requested NF Service Producer for consuming a NF Service.

Service authorization grants should be based on the type of NF Service Consumer, and on the service authorization information that is configured as one of the components in a NF profile of a NF Service Producer. The service authorization information may include the NF type or types and NF realms or origins that are allowed to consume the NF Service(s) of the NF Service Producer.

In 5G SBA, there are multiple NFs requesting services from each other. A service authorization framework is required that supports: (i) NF Service Consumer-NF Service Producer interactions; (ii) authentication of the NF Service Consumer that is requesting access to the service(s) of another NF (e.g., services of a NF Service Producer); (iii) obtaining authorization grants during Network Function Service discovery; (iv) using the obtained authorization grants during Network Function Service access; and (v) NF and Network Function Service registration and de-registration. In addition, a service authorization framework should be scalable for different network scenarios, including: (i) whether granularity of authorization is for a NF, or for each service within the NF; (ii) whether the granularity is per user; and (iii) whether authorization is time-based, has a duration associated with it, etc.

The OAuth 2.0 authorization framework enables third-party applications to obtain limited access to services on behalf of a resource owner by orchestrating an approval interaction between the resource owner and the service, or by allowing a third-party application to obtain access on its own behalf, as described in Internet Engineering Task Force (IETF) Request for Comments (RFC) 6749, entitled "The OAuth 2.0 Authorization Framework," which is incorporated by reference herein.

Figure 4:
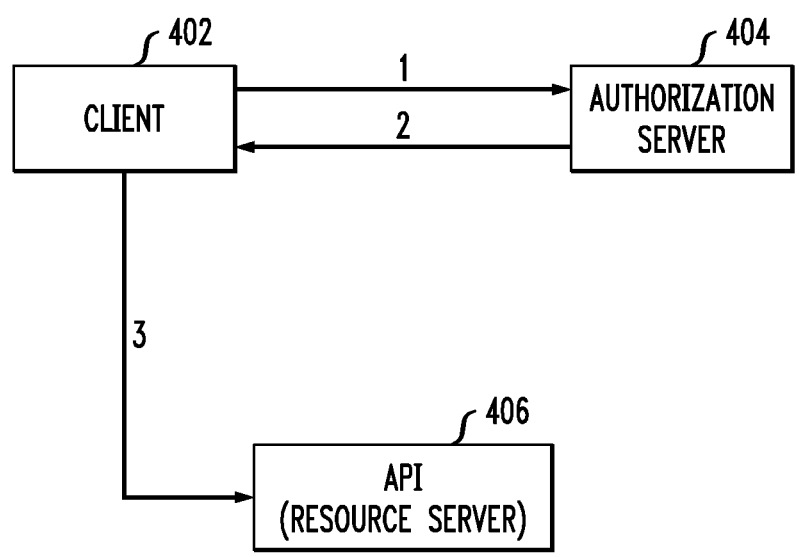
FIG. 4 illustrates a message flow for a procedure for credentials grant, according to an illustrative embodiment.

FIG. 4 provides an illustration of an OAuth Client credentials grant type, which is typically used when a client 402 is acting on its own behalf (i.e., where the client 402 is also the resource owner, or is requesting access to protected resources based on an authorization previously arranged with authorization server 404). In step 1, before invoking a Representational State Transfer (Restful) hypertext transfer protocol (HTTP) based application programming interface (API) on the resource server 406, the client 402 authenticates with the authorization server 404 by presenting its credentials. The credentials may include a client identifier (client_id) and a client_secret (client_secret). The client_id is issued by the authorization server 404 when the client 402 registers with the authorization server 404 (e.g., in a separate step, which may be an out-of-band step). This registration may be part of a separate step not illustrated in FIG. 4. In step 2, the authorization server 404 validates the client 402 using the provided client_id and client_secret, and returns an access token to the client 402. In step 3, the client 402 uses the access token to call the API of resource server 406.

JavaScript Object Notation (JSON) Web Tokens (JWTs) may be used to create access tokens that assert some number of claims, as described in IETF RFC 7519, entitled "JSON Web Token (JWT)," which is incorporated by reference herein. JWT is an open standard that defines a compact and self-contained way for securely transmitting information or claims encoded as a JSON object between two parties.

JWTs are typically sent either integrity protected or encrypted, although unsecured JWTs are allowed. A JWT may be signed using JSON Web Signature (JWS). JWTs can be signed by the issuer (e.g., authorization server 404) either using a shared secret (e.g., using a keyed-hash message authentication code (HMAC) algorithm) or with a private key (e.g., an RSA private key). The JSON Web Signature (JWS) standard may be used to integrity protect JWTs. The JWS standard is described in IETF RFC 7515, entitled "JSON Web Signature (JWS)," which is incorporated by reference herein. A signed JWT is usually referred to as a JWS object.

A signed JWT or JWS includes a digital signature (e.g., when using asymmetric keys such as an RSA private key-public key pair) or a HMAC value (e.g., when a symmetric key is used). The integrity protection covers the JWT header (e.g., which includes information on the algorithm used) and the JSON payload (e.g., which includes the claim or information). The receiver party (e.g., the API resource server 406) can therefore trust the received information and independently verify the integrity of the information as its shares the secret with the issuer, or has the public key of the issuer (e.g., in cases where asymmetric keys such as RSA private key-public key pairs are used).

The JWT may be encrypted, such as utilizing JSON Web Encryption (JWE) as described in IETF RFC 7516, entitled "JSON Web Encryption (JWE)," which is incorporated by reference herein. JWTs can be encrypted with JWE if there are JSON claims that need to be concealed in storage and/or in transit. JWE supports Authenticated Encryption with Associated Data (AEAD) based cryptographic algorithms, and therefore supports the ability to provide both integrity and confidentiality services using a single algorithm. JWE may therefore be used as a single tool for both integrity protection and confidentiality of a message.

JWT may be used with the OAuth 2.0 authorization framework, as will be described with reference to the OAuth 2.0 client credentials flow of FIG. 4. Step 1 of FIG. 4 may proceed in the manner described above. In step 2 of FIG. 4, a signed or encrypted JSON Web Token or JWT is returned by the authorization server 404 as the access token. The claims in the JWT contain information required for the API resource server 406 to identify the client 402, scope of access, duration, etc. When the client 402 calls the API of resource server 406 in step 3, the client 402 sends the protected JWT in the API request, typically in the authorization header using the Bearer schema. For example, the content of the header may look like "Authorization: Bearer <token>."

Since JWTs are self-contained and secure, they can be passed on easily without any worry of being tampered. All the required information is there, and the API resource server 406 can validate the access token of client 402 on its own, thus avoiding the need for an additional call to the authorization server 404 or a look-up in a database.

For the 5G SBA service authorization framework, aspects of the OAuth 2.0 framework and JWT, JWS and JWE standardized mechanisms may be adopted. The Network Repository Function (NRF) plays the role of the OAuth Authorization server (e.g., authorization server 404 in FIG. 4). The NRF's public certificate is shared with all NF Service Consumers within a PLMN, such as within the HPLMN or VPLMN of FIG. 3. NF Service Consumers (e.g., other NFs within the PLMN such as HPLMN or VPLMN of FIG. 3) play the role of the OAuth client (e.g., client 402 in FIG. 4). The client (e.g., NF Service Consumer) registers with the authorization server (e.g., the NRF) as part of the NF Registration procedure to obtain a client_id and client_secret from the NRF. A NF Service Consumer may provide its public key during registration. The public key of the NF Service Consumer is used if the JWT needs encryption. NF Service Producers play the role of the OAuth resource server (e.g., resource server 406 in FIG. 4).

The NF Service Consumer obtains a protected JSON Web Token or JWT at the time of NF service discovery. The JWT may be digitally signed by the NRF for integrity protection, or encrypted by a randomly generated Content Encryption Key (CEK) which is further protected by the NF Service Producer's public key. This requires the NRF to be in possession of the NF Service Producer's public key (e.g., which is provided at the time of registration).

The scope in the JWT access token indicates the authorized level of access for the NF Service Consumer. If needed, the scope will include NF services that the NF Service Consumer is authorized to access in the NF Service Producer. The NF Service Consumer presents the obtained JWT to the NF Service Producer when requesting access to a service provided by the NF Service Producer. The NF Service Producer verifies the received JWT based on the NRF's public certificate. If the verification is successful, the requested NF service is granted to the NF Service Consumer by the NF Service Producer.

The OAuth 2.0 authorization framework is the industry-standard protocol for API authorization. It is a protocol that is typically used for delegated access where a resource owner (user) grants limited access to his resources on one site (protected resource), to another site (client), without having to expose his secret credentials (password, etc.). OAuth is also widely popular in machine to machine scenarios where there is no user involved, and service interaction is between two independent services (e.g., NFs). In the context of Restful API access, OAuth 2.0 can be used for granting clients limited access to a protected web service or API. This is done by an authorization server which issues access tokens to the clients.

The OAuth 2.0 framework defines the following roles: (i) resource owner (e.g., the user); (ii) resource server (e.g., the API server); (iii) client; and (iv) authorization server. The resource owner is an entity capable of granting access to a protected resource. When the resource owner is a person, it is referred to as an end-user. The resource server is a server hosting the protected resources, capable of accepting and responding to protected resource requests using access tokens. This is the API the client wants to access. The client is an application making protected resource requests on behalf of the resource owner and with its authorization. The authorization server is the server issuing access tokens to the client after successfully authenticating the resource owner and obtaining authorization.

From IETF RFC 6749,

"Instead of using the resource owner's credentials to access protected resources, the client obtains an access token—a string denoting a specific scope, lifetime, and other access attributes. Access tokens are issued to third-party clients by an authorization server with the approval of the resource owner. The client uses the access token to access the protected resources hosted by the resource server.

For example, an end-user (resource owner) can grant a printing service (client) access to her protected photos stored at a photo-sharing service (resource server), without sharing her username and password with the printing service. Instead, she authenticates directly with a server trusted by the photo-sharing service (authorization server), which issues the printing service delegation-specific credentials (access token)."

OAuth 2.0 supports several different grants or ways of retrieving an access token. Deciding which type of grant to use depends mostly on the type of client. An Authorization Code Grant is used to access an API from a regular web application based client. Authorization Code using Proof Key for Code Exchange (PKCE) is used to access an API from a mobile application. An Implicit Grant is used to access an API from a client-side application (e.g., a JavaScript application running within a browser). A Resource Owner Password Grant is used by highly trusted applications to access an API. The Resource Owner Password Grant is used when there is a high degree of trust between the user and the client. A Client Credentials Grant is used to access an API from a Non-Interactive Client (e.g., a service running on a machine). The Client Credentials Grant is used in machine-to-machine interfaces where the client is also the resource owner, and is suitable for server-to-server interfaces.

In 5G SBA, NF service authorization is required to ensure that NF Service Consumers are authorized to access NF services provided by NF Service Providers. The OAuth 2.0

Client Credentials Grant type fits well for this purpose. When the Client Credentials Grant type is used, the NF Service Consumer is the client (and the resource owner), and the NF Service Producer is the API or resource server.

The Client Credentials Grant type is typically used when the client is acting on its own behalf (e.g., when the client is also the resource owner), or is requesting access to protected resources based on an authorization previously arranged with the authorization server. Thus, as shown in FIG. 4, the client 402 before invoking the Restful HTTP based API of resource server 406 authenticates with the authorization server 404 in step 1 by presenting its credentials (e.g., its client_id and client_secret). The client_id and client_secret, or more generally the client credentials, are issued by the authorization server 404 when the client 402 registers with the authorization server 404 (e.g., in an out-of-band step). In step 2 of FIG. 4, the authorization server 404 validates the client 402 and returns an access token. The client 402 in step 3 of FIG. 4 uses the access token to call the API of resource server 406.

The access token is a credential that can be used by a client to access an API. The purpose of the access token is to inform the API that the bearer of the token has been authorized to access the API and perform specific actions (as specified by the scope that has been granted). The access token is usually used as a Bearer credential and transmitted in an HTTP Authorization header to the API. Additional details regarding bearer access tokens are described in IETF RFC 6750, entitled "The OAuth 2.0 Authorization Framework: Bearer Token Usage," which is incorporated by reference herein.

The access token is typically one of two types: (i) Opaque String; and (ii) JSON Web Token or JWT. The Opaque String type, described in IETF RFC 6750, has an associated scope and lifetime. The access token is of type bearer, where whoever holds the token can make an HTTP request to the protected web API. The caveat for this token type is that access tokens must be kept secret always and only used over secure HTTP (HTTPS)—there is no built-in protection. Validation is done out of band by the resource server through its interface with the authorization server.

JWT, as described above, is an open standard that defines a compact and self-contained way for securely transmitting information or claims encoded as a JSON object between two parties. JWTs are typically sent either integrity protected or encrypted, although unsecured JWTs are allowed. The JWT may be signed using JWS, where the JWT is signed by the issuer (e.g., the authorization server) either using a shared secret or with its private key. The JSON Web Signature or JWS standard is used to integrity protect JWTs. A signed JWT is usually referred to as a JWS object. A signed JWT or JWS includes a digital signature or an HMAC value. The integrity protection covers: (i) the JWT Header, which includes information on the algorithm used; and (ii) the JSON Payload, which includes the claim or information. The receiver party (e.g., the API or resource server) can therefore trust the received information and independently verify the integrity of the information as it shares the secret with the issuer or has the public key of the issuer.

In some cases, the JWT is encrypted using JWE as described above. Encrypted JWT using JWE may be used if there are JSON claims in the access token that need to be concealed in storage and transit. JWE supports AEAD based crypto algorithms, and therefore supports the ability to provide both integrity and confidentiality services using a single algorithm. JWE may therefore be used as a single tool for both integrity protection and confidentiality of the message.

Integrity protecting JWT with JSON Web Signature or JWS will now be described in further detail. The JWT includes three parts, each separated by a dot—a header, payload and a signature. Thus, a JWT looks like "Header. Payload. Signature". The JWT header carries two parts, a first part declaring the type, which is JWT, and a second part indicating the hashing algorithm to use. An example JWT header is:

```
{
  "typ":"JWT",
  "alg":"RS256"
}
``` where "RS256" in this example denotes an RSA public/private key pair. Once base64 encoded, the first part of the JSON is: eyJhbGciOiJIUzI1NiIsInR5cCI6IkpXVCJ9.

The JWT payload contains the JWT claims. The JWT payload is where the information to transmit is put, along with other information about the access token. There are multiple claims that may be provided, including registered claim names, public claim names and private claim names. Examples of Internet Assigned Numbers Authority (IANA) registered claims include: (i) iss—the issuer of the token; (ii) sub—the subject of the token; (iii) and—the audience of the token; (iv) exp—defines the expiration time on or after which the JWT must not be accepted for processing; (v) nbf—defines the time before which the JWT must not be accepted for processing; (vi) iat—the time the JWT was issued, which can be used to determine the age of the JWT; and (vii) jti—a unique identifier for the JWT, which can be used to prevent the JWT from being replayed and is helpful for one time use tokens. Public claims are claims that the system can create itself, and can be anything such as a user name, IP address, etc. Private claims are claims that a NF Service Producer and NF Service Consumer may agree to that are private. It is to be appreciated that the specific types of claims described above are presented by way of example only, and that embodiments are not limited solely to use with the above-described claims.

An example JWT payload with two registered claims (iss and exp) and two public claims (name and IP address) is:

```
{
  "iss":"3gpp.org",
  "exp":1300819380,
  "name":"FirstName LastName",
  "IP address":"10.10.10.10"
}
```

Once the JWT payload is base64 encoded, the second part of the JSON is: eyJpc3MiOiJzY290Y2guaW8iLCJleHAiOjEzM.

The JWT signature is the third part of the JWT. The signature is made up of a hash of the header, the payload and a secret. For example, with HMAC SHA 256, the JWT signature is HMACSHA256 (encoded string of the header and payload, 'secret'). The third part of the JWT using the examples above is thus 03f329983b86f7d9a9f5f-ef85305880101d5e302afa.

The signed JWT or JWS is a concatenation of the three parts, separated by periods. Again, continuing with the above example JWT, the JWS is:

"eyJhbGciOiIlUzI1NiIsInR5cCI6IkpXVCJ9.eyJpc3MiOiJ-zY290Y2guaW8iLCJleHAiOjEz M.03f329983b86f7d9a9f-5fef85305880101d5e302afa".

As mentioned above, in the 5G SBA service authorization framework the OAuth 2.0 roles are performed as follows: the NRF is the OAuth 2.0 authorization server; the NF Service Consumer is the OAuth 2.0 client; and the NF Service Producer is the OAuth 2.0 resource server. In the description below, it is assumed that an RSA digital signature scheme is used to integrity protect the JWT. It should be appreciated, however, that other types of signature schemes and more generally other types of integrity protection may be used, including HMAC or symmetric key approaches. The NRF is the entity that generates the JWT based access token and computes a digital signature on it. The security mechanism is based on public key/private key pair using RSA. The NRF's private key is used to digitally sign the access token. Every NF in the SBA has in its possession the NRF's public key, which it obtained during registration. The NF Service Producer uses the NRF public key to verify the digital signature when it receives a JWT based access token from a NF Service Consumer.

Figure 5:
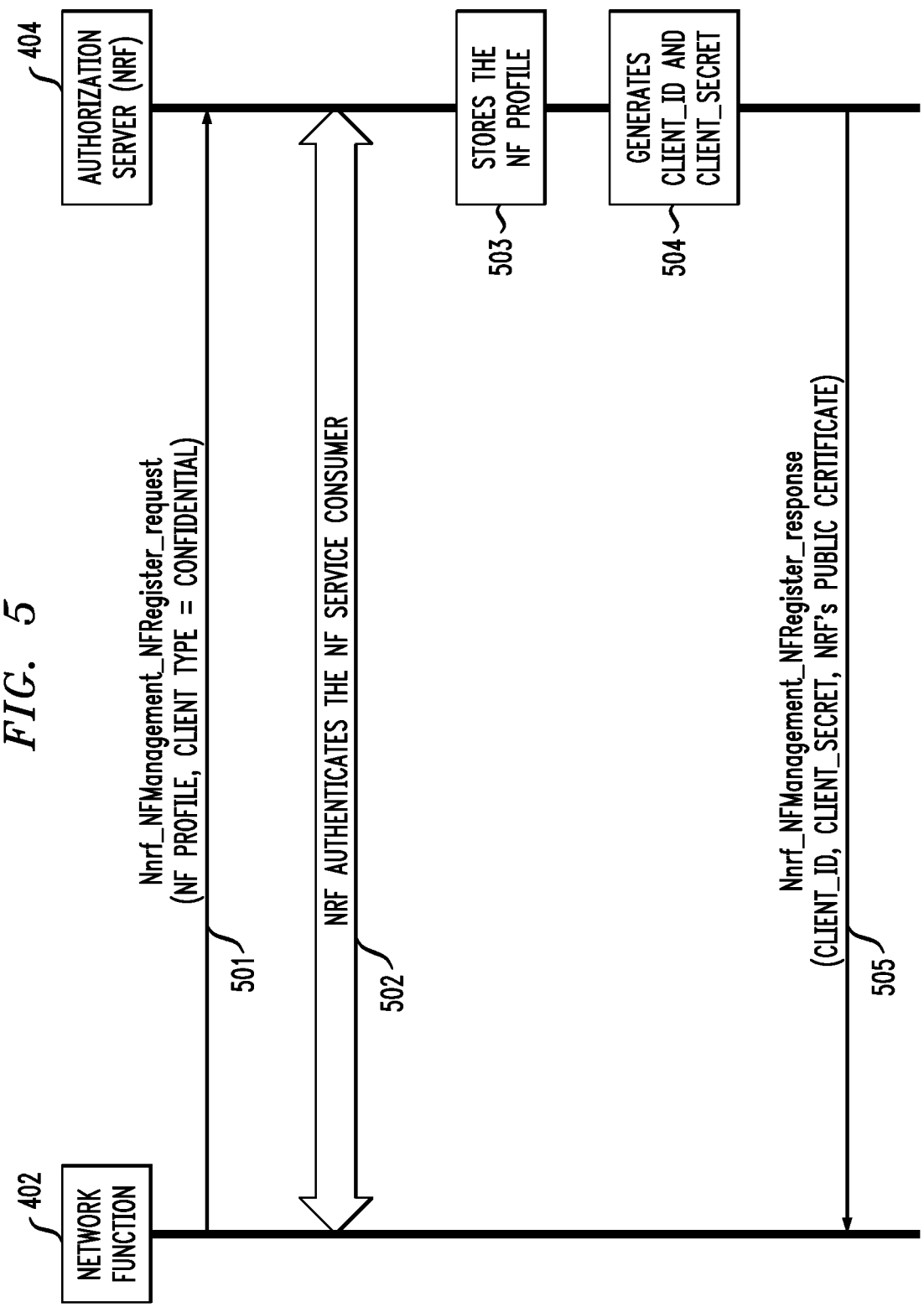
FIG. 5 illustrates a message flow for a procedure for network function registration, according to an illustrative embodiment.

FIG. 5 illustrates a message flow for NF service registration. NF service registration procedure between NFs and NRF is defined in clause 4.17.1 of TS 23.502. It is used as the underlying procedure to perform OAuth client registration (e.g., of a NF 402 such as a NF Service Consumer) with the OAuth server (e.g., NRF 404). While FIG. 5 is described with respect to the NF 402 being a NF Service Consumer, it is to be appreciated that the NF 402 may also represent a NF Service Producer. More generally, it should be noted that a given NF may act as both a NF Service Consumer and a NF Service Producer in different scenarios.

The NF 402 in step 501 provides its client type and profile information when it registers with the NRF 404 (e.g., using a Nnrf_NFManagement_NFRegister_request). In step 502, the NRF 404 authenticates the NF 402 before registering the NF 402. In the process, the NRF 404 stores the profile of the NF 402 in step 503 and generates a client_id (e.g., a username) and client_secret (e.g., a password) for NF 402 in step 504. The NRF 404 provides the client_id and client_secret, along with its public key certificate, in the registration response (e.g., Nnrf_NFManagement_NFRegister_response) in step 505.

Figure 6:
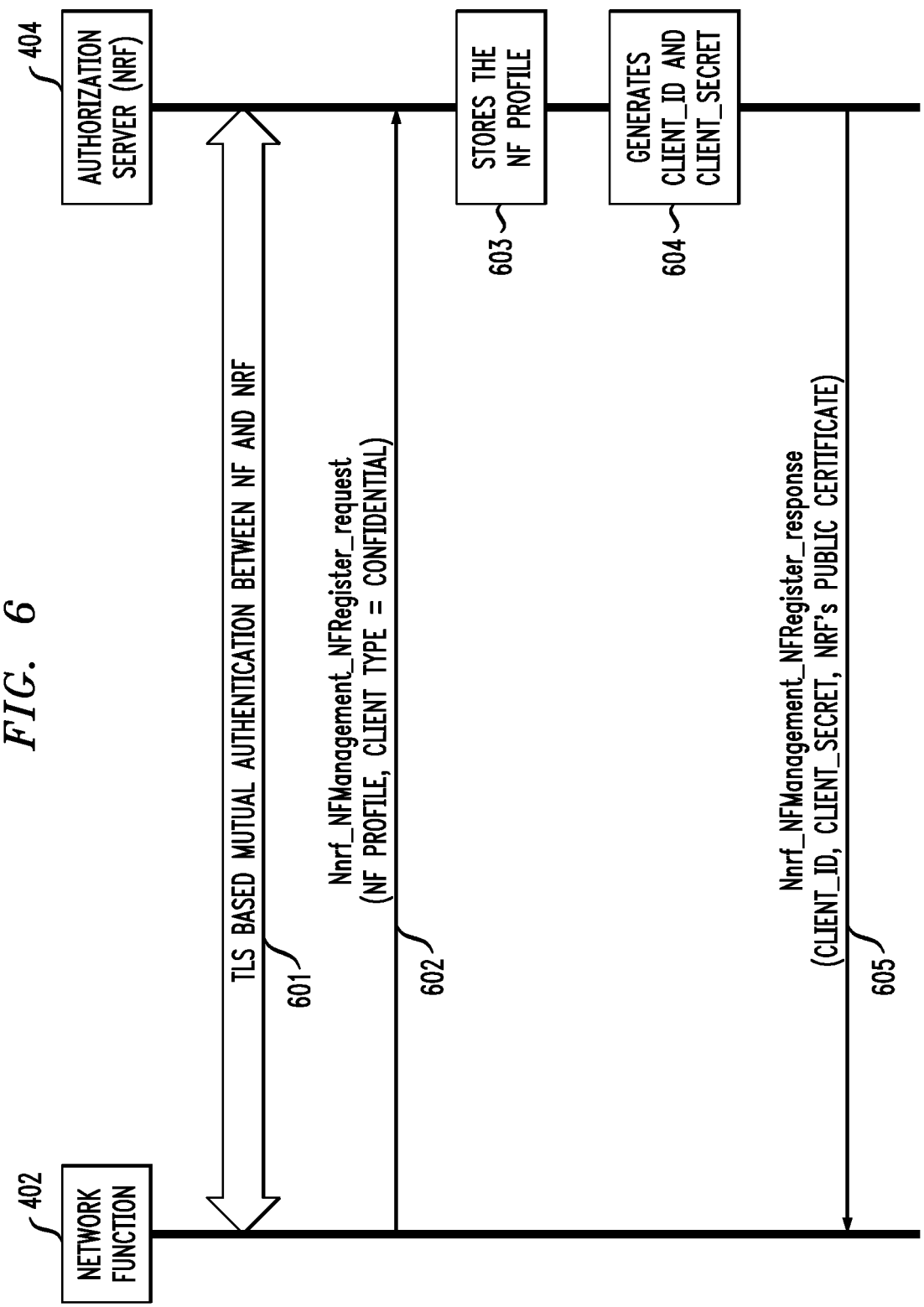
FIG. 6 illustrates a message flow for a procedure for network function registration with mutual authentication, according to an illustrative embodiment.

FIG. 6 illustrates a message flow for NF service registration with mutual authentication between the NF 402 and NRF 404. The mutual authentication may be Transport Layer Security (TLS) certificate based mutual authentication between the NF 402 and NRF 404 in step 601. A secure connection is thus established between the NF 402 and NRF 404. The NF service registration is then performed over the secure connection. Steps 602, 603, 604 and 605 are the same as steps 502, 503, 504 and 505 in the FIG. 5 message flow. In step 605 of the FIG. 6 message flow, however, it may not be required to provide the NRF 404's certificate in the registration response since the mutual authentication in step 601 may be performed based on certificates.

Figure 7:
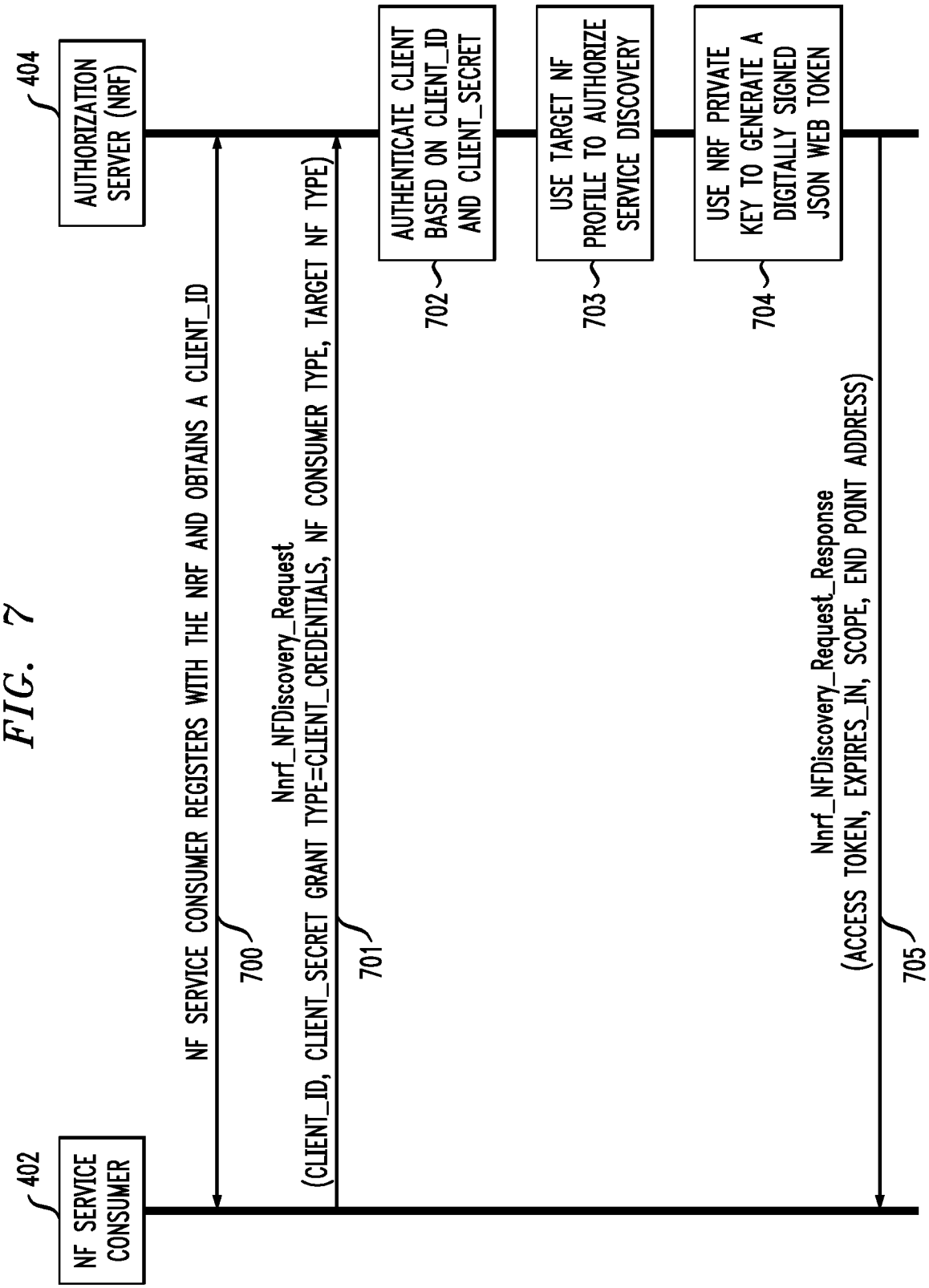
FIG. 7 illustrates a message flow for a procedure for a network function service consumer to obtain an access token during network function service discovery, according to an illustrative embodiment.

FIG. 7 illustrates a message flow for the NF 402 to obtain an access token during network function service discovery with the NRF 404. NF service discovery procedure between NFs and NRF in the same PLMN (e.g., such as in one of the HPLMN or VPLMN of FIG. 3) is defined in clause 4.17.4 of TS 23.502. It is used as the underlying procedure by the NF Service Consumer to obtain an access token from the NRF authorization server 404.

In step 700, as a prerequisite, the NF Service Consumer 402 registers with the NRF 404 and obtains the client_id and client password or client_secret. Also in step 700, the NRF 404's public key is shared with the NF Service Producer 406 (not shown in FIG. 7). The NRF 404's public key is used in some embodiments for generating digital signatures as described elsewhere herein.

The NF Service Consumer 402 in step 701 invokes the Nnrf_NFDiscovery_Request (e.g., which may include an expected NF service name, NF type of the expected NF instance, the NF type of the NF Service Consumer, etc.) from the NRF 404 (in a same PLMN). As an OAuth client, the NF Service Consumer 402 in step 701 also sends its client_id and client_secret, or more generally its client credentials, in the request message.

The NRF 404 in step 702 authenticates the client NF Service Consumer 402 based on the provided client credentials. If the NF Service Consumer 402 is successfully authenticated, the NRF 404 in step 703 checks the stored NF profile information of the target NF and/or NF service to determine whether the access can be permitted to the NF type of the NF Service Consumer 402.

If the requested service can be provided to the NF Service Consumer 402 of the declared type, the NRF 404 in step 704 generates a JWT based access token with appropriate claims included. The generated JWT is signed with the NRF 404's private key. The claims in the JWT access token include the identity of the NRF 404 (e.g., the issuer), the identity of the NF Service Consumer 402 (e.g., the subject), the identity of the NF instance that provides the requested service (e.g., the audience), the expiration time, etc. In some embodiments, the NRF 404 may restrict access to specific services in the NF Service Producer 406. In such cases, the NRF 404 in step 704 may include an authorized set of services in a separate claim (e.g., the scope) in the JWT access token.

In step 705, the signed JWT access token is included in an Nnrf_NFDiscovery_Request response message that is sent from the NRF 404 to the NF Service Consumer 402. The response message of step 705 may also include an expiration time (e.g., expires_in), an end point address for the discovered NF instance, etc. The scope and expires_in may be equivalent to the corresponding claims in the JWT access token from step 704. The scope field may include all the services that the NF Service Consumer 402 is authorized to access.

While the FIG. 7 message flow is described above with respect to service discovery request (e.g., Nnrf_NFDiscovery_Request in step 701) and service discovery response (e.g., Nnrf_NFDiscovery_Response in step 705) messages, it should be appreciated that other suitable request and response messages may be utilized. For example, the NF Service Consumer 402 in step 701 may issue an access token request and the NRF 404 in step 705 may provide an access token response. Different types of request and response protocols may use different APIs. For example, the service discovery request may use an HTTP GET request, while an access token request may utilize an HTTP POST request.

FIG. 8 illustrates a message flow for a NF Service Consumer 402 to request service access from a NF Service Producer 406 using the access token received in the FIG. 7 message flow. The access token is included in an API that is invoked by the NF Service Consumer 402 to access one or more NFs of the NF Service Producer 406.

In step 800-1, the NF Service Consumer 402 registers with the NRF 404, such as using the message flow of FIG. 5 or FIG. 6. In step 800-2, the NF Service Consumer 402 discovers the target instance from the NRF 404 and obtains the access token to be used for authorization, such as using the message flow of FIG. 7. In step 801, the NF Service Consumer 402 invokes the API for a specific service on the NF Service Producer 406. The parameters included in the API include the access_token, along with the NF Service Consumer 402 instance id. The instance id must match what is included in the "subject" claim of the access token.

In step 802, the NF Service Producer 406 verifies the access token. Verifying the access token in some embodiments includes checking that the JWT is well formed, checking the signature of the JWT using the NRF 404's public key, validating the standard claims in the access token (e.g., the subject, expiration time, issuer, audience claims, etc.), and checking the client permissions (e.g., the scope in the access token). If the checks are successful, the NF Service Producer 406 is assured that the access token received in step 801 was issued by its local NRF 404 and that the access token was issued to the correct NF Service Consumer 402 (e.g., identifier match). In addition, the NF Service Producer 406 knows the exact scope that the NF Service Consumer 402 has been authorized by the NRF 404. In step 803, responsive to successful verification of the access token, the NF Service Producer 406 executes the requested service and provides a NF service response to the NF Service Consumer 402.

It should be emphasized that the various embodiments described herein are presented by way of illustrative example only, and should not be construed as limiting the scope of the claims. For example, alternative embodiments can utilize different communication system configurations, user equipment configurations, base station configurations, messaging protocols and message formats than those described above in the context of the illustrative embodiments. These and numerous other alternative embodiments within the scope of the appended claims will be readily apparent to those skilled in the art.

What is claimed is:

1. A method comprising:
    in a first element or function in a home network of a communication system, registering a second element or function in the home network as a service consumer of one or more services provided by at least a third element or function in the home network;
    receiving a request at the first element or function from the second element or function; and
    responsive to authenticating the second element or function, providing an access token to the second element or function, the access token being usable by the second element or function to access the one or more services provided by the third element or function;
    wherein the access token is provided responsive to:
        successful authentication of the second element or function utilizing client credentials included in the request; and
        matching (i) profile information of the second element or function that is stored as part of registering the second element or function as the service consumer and (ii) profile information of the third element or function that is stored as part of registering the third element or function as a service producer.

2. The method of claim 1, wherein the first element or function in the home network of the communication system comprises a Network Repository Function (NRF) of a 5G communication system.

3. The method of claim 1, wherein registering the second element or function comprises:
    receiving, at the first element or function from the second element or function, a registration request specifying a client type of the second element or function and the profile information for the second element or function;
    responsive to successful authentication of the second element or function, storing the profile information for the second element or function and generating a client identifier and client secret for the second element or function; and
    providing, from the first element or function to the second element or function, a registration response specifying the client identifier, the client secret and a public certificate of the first element or function.

4. The method of claim 1, wherein the request specifies:
    a client identifier and client secret for the second element or function; and
    information regarding the expected network function service of the third element or function to be consumed by the second element or function.

5. The method of claim 4, wherein the information regarding the expected network function service of the third element or function to be consumed by the second element or function comprises:
    an expected service name of one or more of the services provided by the third element or function;
    a network function type of the third element or function; and
    a network function type of the second element or function.

6. The method of claim 4, further comprising:
    authenticating the second element or function utilizing the client identifier and the client secret;
    using a network function profile of the second element or function to authorize service discovery by the second element or function; and
    generating the access token, the access token comprising a first claim identifying the first element or function as an issuer of the access token, a second claim identifying the second element or function as the subject of the access token, a third claim identifying the third element or function providing requested services as an audience of the access token, and at least a fourth claim specifying an expiration time of the access token.

7. The method of claim 5, wherein the access token further comprises at least a fifth claim identifying a set of authorized services for the second element or function as the scope of the access token.

8. The method of claim 1, wherein providing the access token to the second element or function comprises providing the access token in a response message to the second element or function, the response message comprising:
    the access token;
    an expiration time of the access token;
    a scope of access provided by the access token; and
    an end point address of the third element or function providing the services to be consumed by the second element or function.

9. The method of claim 1, wherein the access token comprises a JavaScript Object Notation (JSON) Web Token (JWT) that is digitally signed using a private key of the first element or function.

10. An apparatus comprising:
    at least one processor;
    at least one memory including computer code;
    the at least one memory and the computer code being configured to, with the at least one processor, cause the apparatus at least to:
        in a first element or function in a home network of a communication system, register a second element or function in the home network as a service consumer of one or more services provided by at least a third element or function in the home network;

receive a request at the first element or function from the second element or function; and responsive to authenticating the second element or function, provide an access token to the second element or function, the access token being usable by the second element or function to access the one or more services provided by the third element or function;

wherein the access token is provided responsive to:
successful authentication of the second element or function utilizing client credentials included in the request and matching (i) profile information of the second element or function that is stored as part of registering the second element or function as the service consumer and (ii) profile information of the third element or function that is stored as part of registering the third element or function as a service producer.

11. A method comprising:

registering, in a first element or function in a home network of a communication system, a second element or function in the home network of the communication system as a service consumer of one or more services provided by at least a third element or function in the home network;

providing a request from the second element or function to the first element or function;

receiving, at the second element or function from the first element or function, an access token;

providing the access token from the second element or function to the third element or function to request access to the one or more services provided by the third element or function; and receiving access to the requested one or more services responsive to the third element or function successfully verifying the access tokens;

wherein the access token is received responsive to:
successful authentication of the second element or function utilizing client credentials included in the request; and matching (i) profile information of the second element or function that is stored as part of registering the second element or function as the service consumer and (ii) profile information of the third element or function that is stored as part of registering the third element or function as a service producer.

12. An apparatus comprising:
at least one processor;
at least one memory including computer code;
the at least one memory and the computer code being configured to, with the at least one processor, cause the apparatus at least to:
register, in a first element or function in a home network of a communication system, a second element or function in the home network of the communication system as a service consumer of one or more services provided by at least a third element or function in the home network;
provide a request from the second element or function to the first element or function;
receive, at the second element or function from the first element or function, an access token;
provide the access token from the second element or function to the third element or function to request access to the one or more services provided by the third element or function; and
receive access to the requested one or more services responsive to the third element or function successfully verifying the access token;

wherein the access token is received responsive to:
successful authentication of the second element or function utilizing client credentials included in the request; and matching (i) profile information of the second element or function that is stored as part of registering the second element or function as the service consumer and (ii) profile information of the third element or function that is stored as part of registering the third element or function as a service producer.

13. A method comprising:

receiving, from a first element or function in a home network of a communication system at a third element or function in the home network of the communication system, a public key of the first element or function;

receiving, from a second element or function in the home network at the third element or function, a request for one or more services provided by the third element or function, the request for services comprising an access token; and executing the requested one or more services for the second element or function responsive to a successful verification of the access token using the public key of the first element or function, wherein the access token is generated responsive to:
successful authentication of the second element or function utilizing client credentials included in a request received at the first element or function from the second element or function; and matching (i) profile information of the second element or function that is stored as part of registering the second element or function as a service consumer and (ii) profile information of the third element or function that is stored as part of registering the third element or function as a service producer.

14. The method of claim 13, wherein the access token comprises a JavaScript Object Notation (JSON) Web Token (JWT) that is digitally signed using a private key of the first element or function.

15. The method of claim 14, further comprising verifying the digitally signed JWT by:

checking the signature of the JWT using the public key of the first element or function;

validating the claims of the access token, the claims comprising a first claim identifying the first element or function as an issuer of the access token, a second claim identifying the second element or function as the subject of the access token, a third claim identifying the third element or function providing requested services as an audience of the access token, and at least a fourth claim specifying an expiration time of the access token; and checking the client permissions specified in at least a fifth claim of the access token, the fifth claim identifying a set of authorized services for the second element or function as the scope of the access token.

16. The method of claim 13 further comprising verifying the access token to determine whether the access token was issued by a local Network Resource Function (NRF) of the home network of the communication system and to determine whether the local NRF of the home network issued the access token to the second element or function by matching an identifier of the second element or function included in the request for services with an identifier of a network function service consumer included in the access token.

17. An apparatus comprising:
   at least one processor;
   at least one memory including computer code;
   the at least one memory and the computer code being configured to, with the at least one processor, cause the apparatus at least to:
   receive, from a first element or function in a home network of a communication system at a third element or function in the home network of the communication system, a public key of the first element or function;
   receive, from a second element or function in the home network at the third element or function, a request for one or more services provided by the third element or function, the request for services comprising an access token; and
   execute the requested one or more services for the second element or function responsive to a successful verification of the access token using the public key of the first element or function;
   wherein the access token is generated responsive to:
      successful authentication of the second element or function utilizing client credentials included in a request received at the first element or function from the second element or function; and
      matching (i) profile information of the second element or function that is stored as part of registering the second element or function as a service consumer and (ii) profile information of the third element or function that is stored as part of registering the third element or function as a service producer.

* * * * *